(12) United States Patent
Gebhard

(10) Patent No.: US 7,934,327 B2
(45) Date of Patent: May 3, 2011

(54) TORSION SYSTEM FOR AN ARTICLE OF FOOTWEAR

(75) Inventor: Jeffrey Gebhard, Portland, OR (US)

(73) Assignee: adidas International B.V., Amsterdam (NL)

( * ) Notice: Subject to any disclaimer, the term of this patent is extended or adjusted under 35 U.S.C. 154(b) by 2265 days.

(21) Appl. No.: 09/328,749

(22) Filed: Jun. 9, 1999

(65) Prior Publication Data
US 2001/0022041 A1  Sep. 20, 2001

(30) Foreign Application Priority Data
Jun. 9, 1998  (DE) .................. 298 10 357 U (51) Int. Cl.
*A43B 5/00* (2006.01)
*A43B 13/24* (2006.01)
*A43B 5/14* (2006.01)

(52) U.S. Cl. ............... 36/131; 36/15; 36/31; 36/135; 74/594.6

(58) Field of Classification Search .......... 36/131, 36/31, 43, 143, 144, 154, 155, 166, 88, 107, 36/102, 167, 168, 169, 171, 175, 177, 179, 15; 74/594.6

See application file for complete search history.

(56) References Cited

U.S. PATENT DOCUMENTS

| | | | | |
|---|---|---|---|---|
| 3,550,597 A | * | 12/1970 | Coplans | |
| 3,903,621 A | * | 9/1975 | Dubner | 36/44 |
| 4,815,222 A | * | 3/1989 | Eisenbach et al. | 36/131 |
| 4,922,631 A | * | 5/1990 | Anderie | |
| 5,179,791 A | * | 1/1993 | Lain | |
| 5,446,977 A | * | 9/1995 | Nagano et al. | |
| 5,915,820 A | * | 6/1999 | Kraeuter et al. | |
| 5,924,220 A | * | 7/1999 | Ueda et al. | |
| 6,009,641 A | * | 1/2000 | Ryan | |
| 6,038,790 A | * | 3/2000 | Pyle et al. | 36/44 |

* cited by examiner

*Primary Examiner* — Jila M Mohandesi
(74) *Attorney, Agent, or Firm* — Kilpatrick Townsend & Stockton LLP (57) ABSTRACT

An article of footwear includes a torsion system constructed of a material and configured to allow, in a pre-selected manner, rotation of a forefoot portion of the article of footwear relative to a rearfoot portion of the article of footwear about a longitudinal axis of the article while substantially precluding bending in an intermediate portion thereof.

21 Claims, 7 Drawing Sheets

TORSION SYSTEM FOR AN ARTICLE OF FOOTWEAR

CROSS-REFERENCE TO RELATED APPLICATION

This application incorporates by reference, and claims priority to, and the benefit of, German patent application serial number 29810357.5, which was filed on Jun. 9, 1998.

TECHNICAL FIELD

The invention relates to a torsion system for an article of footwear, in particular, a cycling shoe. The torsion system includes a sole plate constructed and configured to allow, in a pre-selected manner, rotation of a forefoot portion of the article of footwear relative to a rearfoot portion of the article of footwear about a longitudinal axis of the article of footwear.

BACKGROUND INFORMATION

Conventional shoes manufactured for cycling typically include an upper, a rigid plate, and an optional rubber outsole. The rigid plate of the cycling shoe is typically made of nylon or composite materials. The rigid plate is provided to enhance pressure distribution between foot and pedal. Conventional cycling shoes are designed to be torsionally rigid for maximum pressure distribution over the pedal. Most cycling plates are rigid to the point of being substantially inflexible. Others incorporate a flexible toe region to facilitate better walking. The rigidity of the plates used in conventional cycling shoes is negligible, for example, 0-5 degrees of angular flex at 50 Newtons (N) of torsional load. Restraining the foot to this rigid plate prohibits the foot's natural ability to flex and cushion.

SUMMARY OF THE INVENTION

In a cycling study conducted by the inventor, the movement of the cyclist's lower extremities was analyzed. The changing muscle groups involved in cycling create a movement called knee looping. Essentially, knee looping is the shifting of the lateral position of the knee between the upstroke and the downstroke. Accordingly, torsionability in a cycling shoe would accommodate knee looping in a biomechanically appropriate way.

It has not been recognized previously that torsionability is important to a cycling shoe. Torsionability is the foot's ability to rotate on a longitudinal axis between the forefoot and rearfoot. Typical motion patterns require the foot to rotate in order to adjust to the ground and to ensure economic roll-off; however, this motion is not limited to ground impact, such as in running, but also to foot interaction with equipment, for example, a bicycle pedal. This pronation and supination motion is a result of joint alignment and force input.

It is an object of the present invention to provide a torsion system for an article of footwear which allows, in a pre-selected manner, the rotation of the forefoot relative to the rearfoot about the longitudinal axis of the foot, thereby reducing and/or preventing premature fatigue or injuries to the wearer.

It is an object of the invention to provide an article of footwear including a torsion system that will allow for the natural movement of the foot. It is another object of the invention to provide a torsion system including a stiff plate with a tuned torsional flex in accordance with the biomechanical needs of a wearer without compromising the vertical stiffness needed for pressure distribution to a pedal or other surface. The tuned torsional flex is determined, in part, by the material and shape of the plate.

Embodiments of the present invention can be used in a variety of sports where knee looping or similar movements occur; however, the embodiments will be discussed herein solely in connection with cycling shoes, by way of example only.

In one aspect, the invention relates to a cycling shoe having a longitudinal axis and including a forefoot portion, a rearfoot portion, and an intermediate portion that couples the forefoot portion and the rearfoot portion. The intermediate portion is constructed of a material and configured to allow, in a pre-selected manner, the rotation of the forefoot portion relative to the rearfoot portion about the longitudinal axis while substantially precluding bending in the intermediate portion.

According to one embodiment, the forefoot and rearfoot portions rotate between about 5-30 degrees relative to each other about the longitudinal axis at 35N of torsional load. The degree of rotation is preferably between about 10-20 degrees, and more preferably about 10 degrees at 35N of torsional load.

According to another embodiment, the intermediate portion may be rotatable. The intermediate portion may also include an I-beam element or rib. The I-beam element or rib stiffens the shoe against vertical flex to maintain rigidity in the horizontal plane without prohibiting torsionability. The rotation of the shoe, also known as torsional flex or torsionability, may be tuned by using I-beam elements or ribs with different torsional resistance.

According to a further embodiment, the torsionability of the shoe may be tuned by thinning or narrowing or both of the intermediate portion relative to the forefoot and rearfoot portions. Thinning the intermediate portion consists of reducing the vertical dimension or thickness of the intermediate portion with respect to the forefoot and rearfoot portions. Narrowing the intermediate portion consists of reducing the lateral dimension of the intermediate portion with respect to the forefoot and rearfoot portions. In addition, the torsionability may be tuned by the addition of at least one aperture in the intermediate portion or by manufacturing the intermediate portion of a material having different mechanical properties than the forefoot and rearfoot portions.

According to yet another embodiment, the forefoot portion, rearfoot portion, and intermediate portion form a single plate. The plate may be rigid in the horizontal plane while still allowing for a pre-selected amount of rotation of the forefoot relative to the rearfoot about the longitudinal axis of the plate. The thickness of the plate may be between about 1-15 millimeters (mm) in thickness, preferably between about 3-10 mm in thickness, and more preferably between about 5-8 mm in thickness. The thickness of the plate may vary depending on the material or combination of materials used. The plate may be manufactured of nylon or composite materials, such as graphite or fiberglass, and is generally coupled to a shoe upper.

Various other embodiments of the torsion system may include a cleat attachment system disposed on the forefoot portion, an upper, an outsole, or a cushioning element. The cleat attachment system may be any known or improved cleat attachment system. The cushioning element may be housed in an aperture located in the rearfoot portion.

These and other objects, along with advantages and features of the present invention herein disclosed, will become apparent through reference to the following description of embodiments of the invention, the accompanying drawings, and the claims.

BRIEF DESCRIPTION OF THE DRAWINGS

In the drawings, like reference characters generally refer to the same parts throughout the different views. Also, the drawings are not necessarily to scale emphasis instead generally being placed upon illustrating the principles of the invention. In the following description, various embodiments of the present invention are described with reference to the drawings which show the following.

FIGS. 2A1-2A3 are a schematic longitudinal cross-section and two schematic side views of the torsion system of FIG. 1.

DESCRIPTION

Embodiments of the present invention are described below. It is, however, expressly noted that the present invention is not limited to these embodiments, but rather the intention is that modifications which are obvious to the person skilled in the art are also included. In particular, the present invention is not intended to be limited to cycling shoes, but rather to be used for all types of footwear where knee looping or similar movements may occur.

According to one embodiment of the present invention, an article of footwear includes a torsion system which is arranged beneath the foot of the wearer. This can be achieved by integrating the torsion system in accordance with the present invention into an outsole of the article of footwear, or sandwiching the torsion system between the outsole and a midsole, or between the midsole and an insole. If the torsion system is arranged within the outsole, it may differ in color from the surrounding material of the sole, so that the torsion system can be recognized readily from outside the footwear. According to another embodiment, the outsole itself consists essentially of the torsion system. In this case, an optional midsole and an optional insole can be applied to the upper side of the torsion system to provide comfort and damping to the wearer of the article of footwear.

Figure 1:
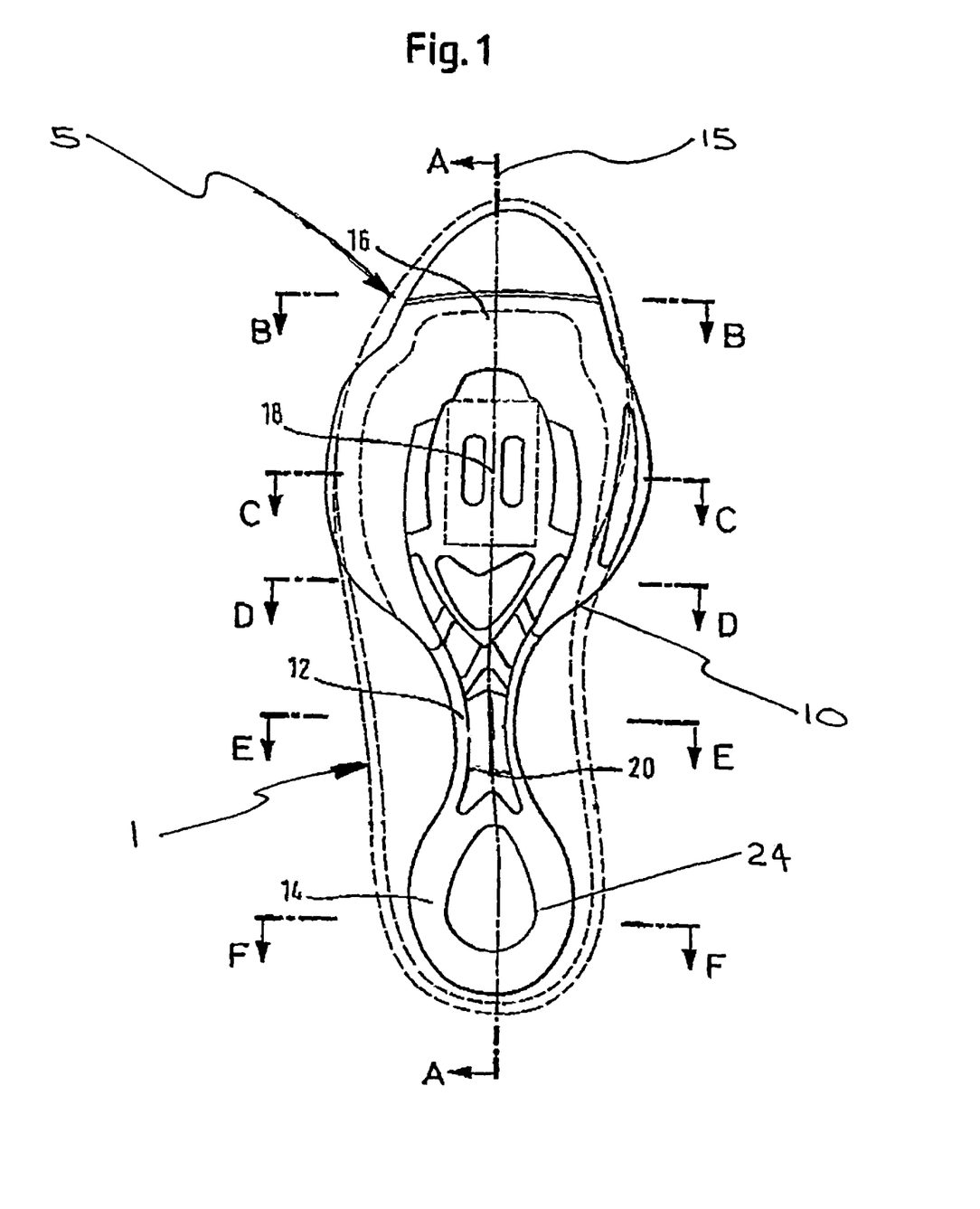
FIG. 1 is a schematic top view of one embodiment of the torsion system of the invention.

One embodiment of a torsion system for an article of footwear 1 (depicted in phantom) for a left foot, in accordance with the present invention, is shown in FIG. 1. The torsion system 5 includes a forefoot portion 16, a rearfoot portion 14, and an intermediate portion 12. The intermediate portion 12 couples the forefoot portion 16 and the rearfoot portion 14. FIG. 1 also depicts a cleat attachment system 18 disposed on the forefoot portion 16 of the torsion system 5. The forefoot, rearfoot, and intermediate portions 16, 14, 12 may form a single plate 10. The plate 10 is rigid in a horizontal plane, i.e., the plate does not flex vertically; however, the intermediate portion 12 allows the forefoot portion 16 to rotate relative to the rearfoot portion 14 about a longitudinal axis 15.

To permit relative rotation of the forefoot and rearfoot portions 16, 14 due to torsional loads, the intermediate portion 12 may be narrower than the forefoot and rearfoot portions 16, 14, as shown in FIG. 1, or may be thinner than the forefoot and rearfoot portions 16, 14. The intermediate portion 12 may also include an I-beam element or rib 20 to stiffen the shoe 1 against vertical flex without prohibiting the rotation of the forefoot relative to the rearfoot. The torsional strength of the I-beam element or rib 20 along its longitudinal axis may be used to tune the torsionability of the shoe 1 about the longitudinal axis 15. In addition, torsion may be provided by constructing the intermediate portion 12 of a material with different mechanical properties than that used for the forefoot and rearfoot portions 16, 14. For example, using a material with a lower torsional strength in the intermediate portion 12 will increase the torsionability flex range of the shoe.

Figure 2A:
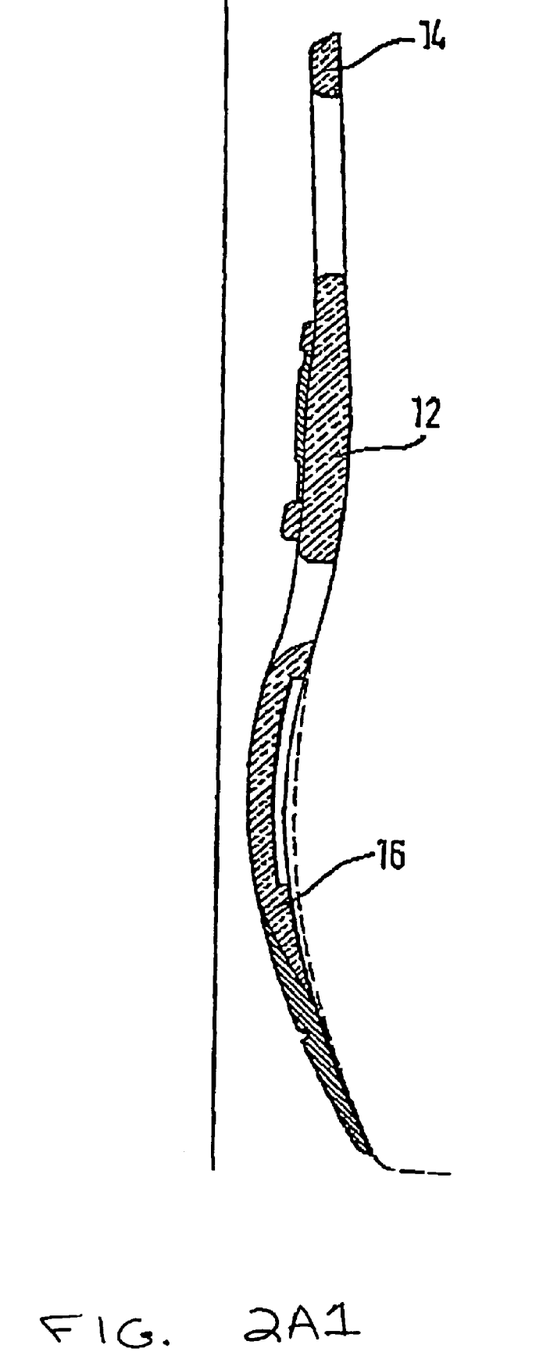
Figure 2A:
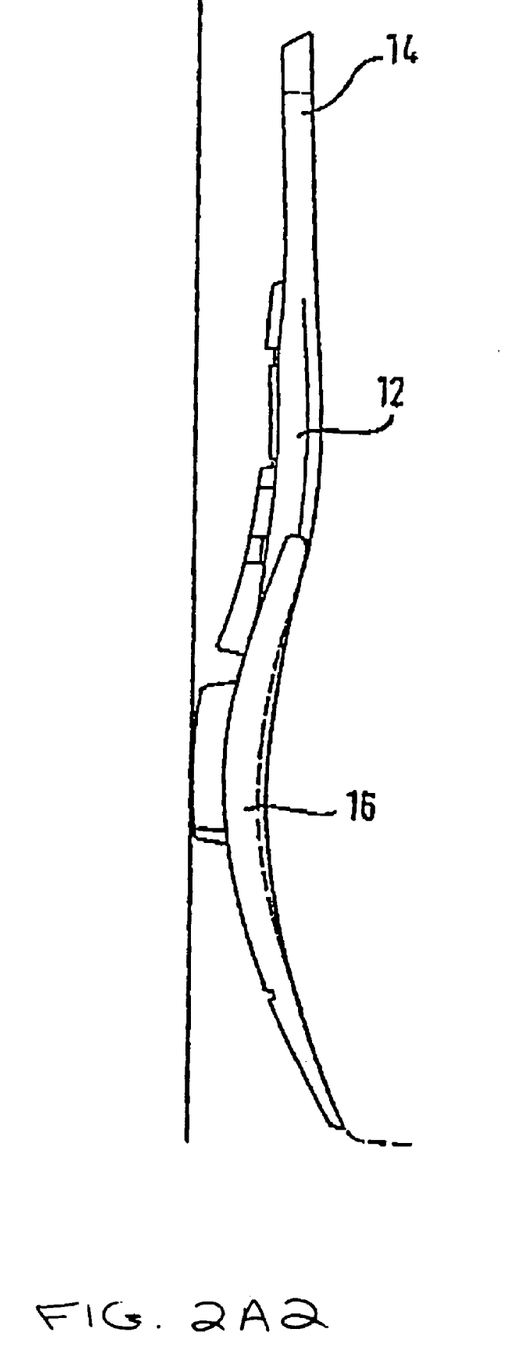
Figure 2A:
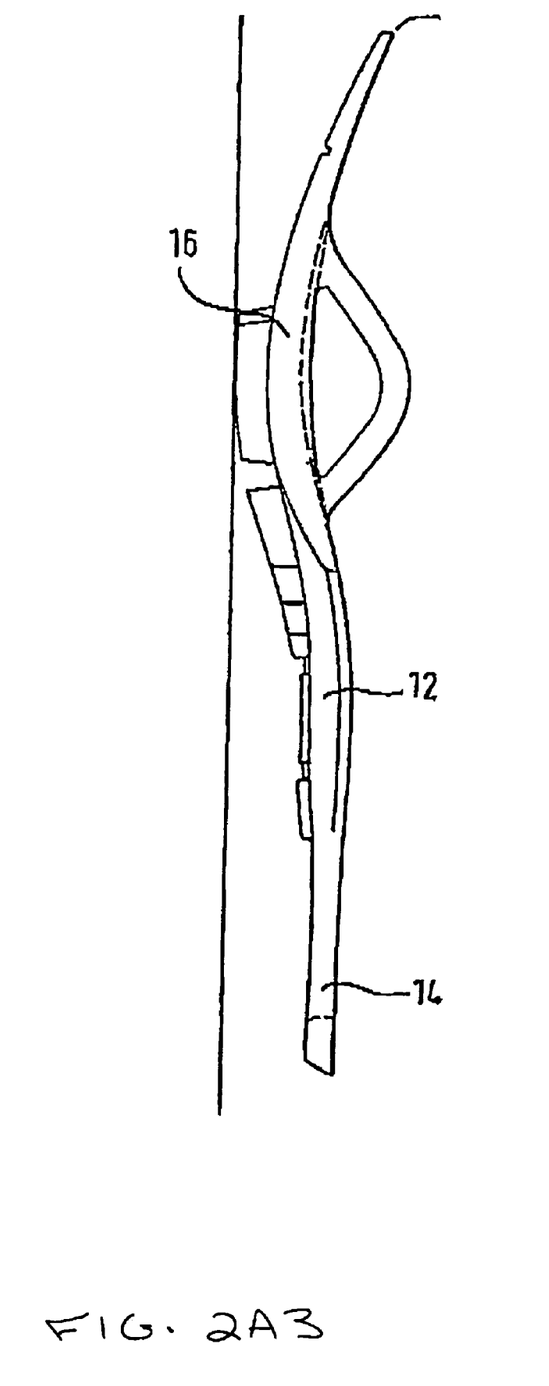
Figure 2B:
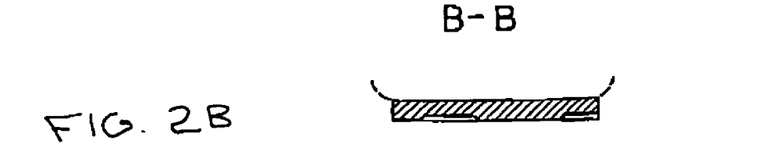
FIGS. 2B-2F are schematic lateral cross-sections B-B through F-F of the torsion system of FIG. 1.
Figure 2C:
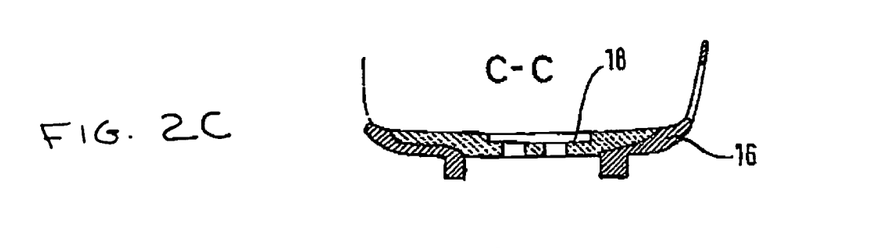
Figure 2D:
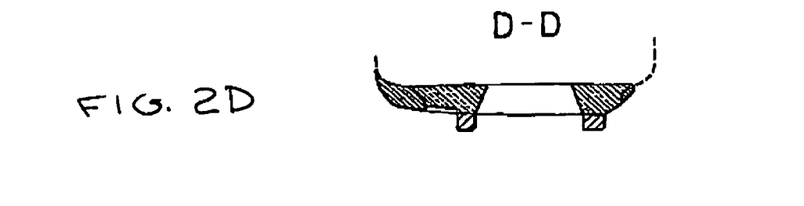
Figure 2E:
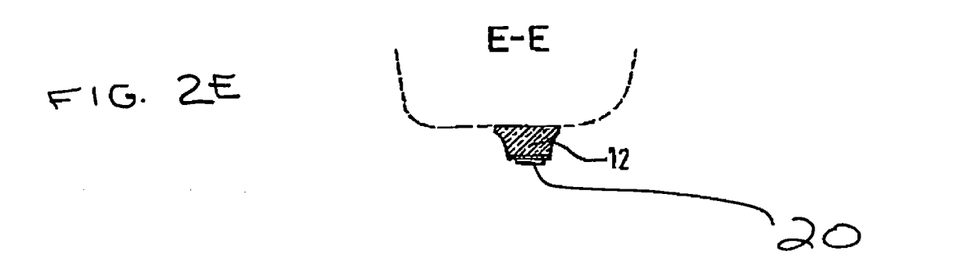
Figure 2F:
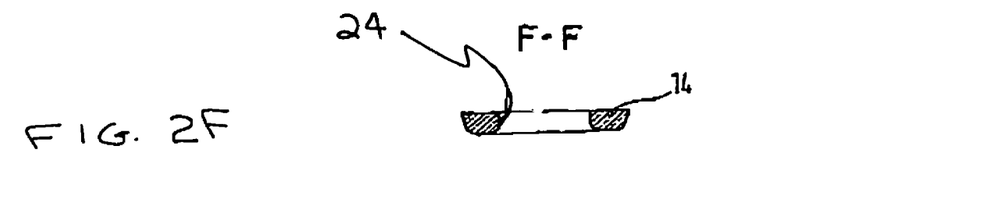

FIGS. 2A1-2A3 represent a cross-sectional view, a lateral side view, and a medial side view of the torsion system 5 of FIG. 1. All three views depict a single plate comprised of a forefoot portion 16, a rearfoot portion 14, and an intermediate portion 12.

FIGS. 2B-2F represent various cross-sectional views of the torsion system 5 of FIG. 1 taken generally perpendicular to the longitudinal axis 15. Section B-B is taken at the front end of the forefoot portion 16. Section C-C is taken at approximately the midpoint of the forefoot portion 16 and illustrates one possible cleat attachment system 18. Section D-D is taken at approximately the point where the forefoot portion 16 couples to the intermediate portion 12. Section E-E is taken at approximately the midpoint of the intermediate portion 12 and illustrates an intermediate portion 12 substantially narrower than the forefoot portion 16. Section F-F is taken at approximately the midpoint of the rearfoot portion 14 and illustrates a rearfoot portion 14 forming a centrally disposed aperture 24.

Figure 3:
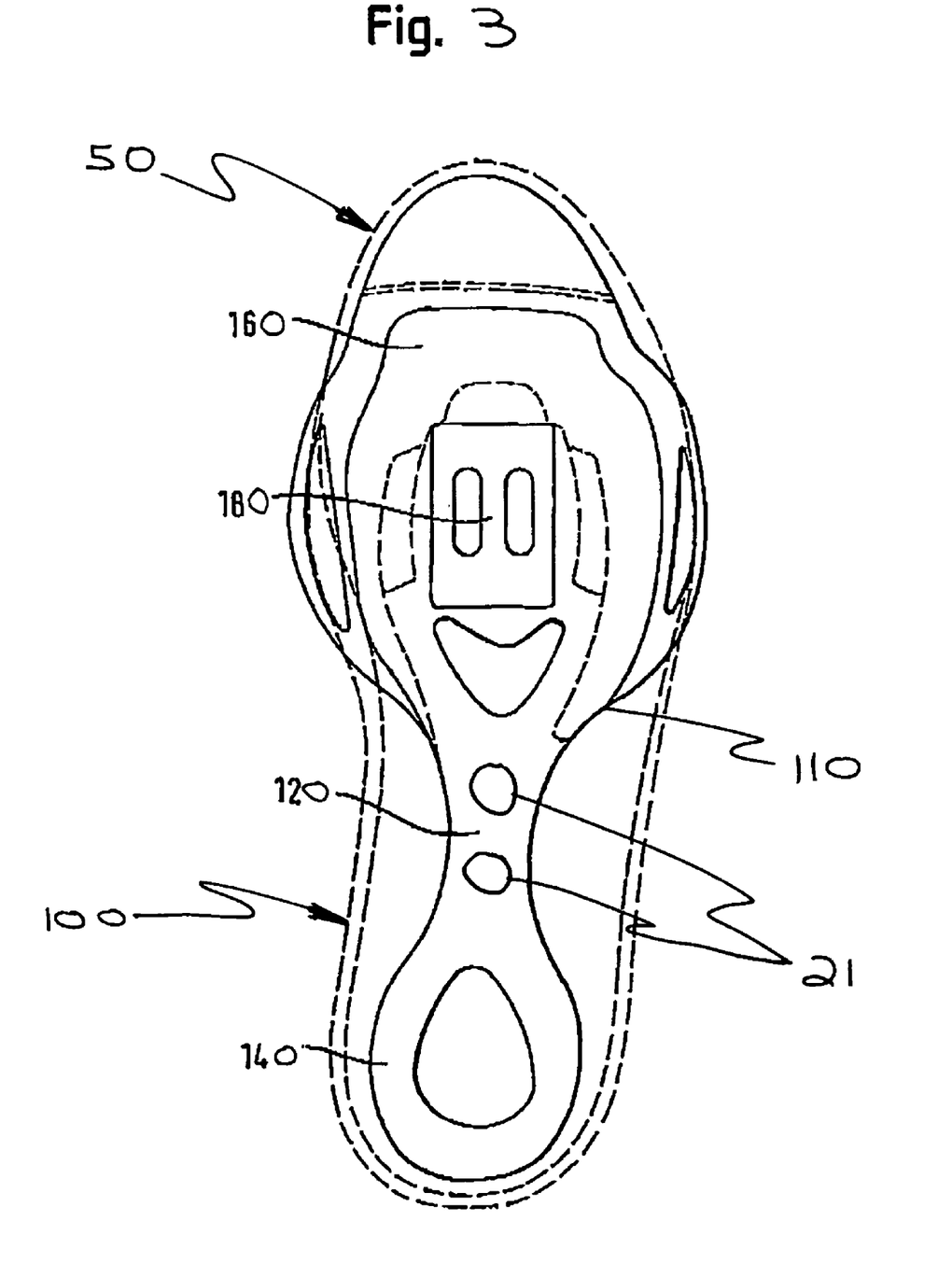
FIG. 3 is a schematic top view of another embodiment of the torsion system, without an I-beam or rib in the intermediate portion.

Another embodiment of a torsion system 50 according to the present invention is shown in FIG. 3. The torsion system 50 may be a single plate 110 having an intermediate portion 120 with reduced lateral dimensions which allows twisting of the forefoot portion 160 of the torsion system 50 (and thereby of the footwear) relative to the rearfoot portion 140. The resistance and twisting of the torsion system 50 in the intermediate portion 120 defines the torsional flex of the footwear. A defined torsional flex can also be achieved by constructing the intermediate area 120 thinner than the forefoot and rearfoot portions 160, 140 or with a material with different mechanical properties than the forefoot and rearfoot portions 160, 140. In addition, apertures 21 may be added to the intermediate portion 12.

In the embodiment depicted in FIG. 3, the I-beam element or rib 20 has been replaced by two apertures 21. It is also possible to have only one aperture located in the intermediate portion and to have an I-beam element or rib used in conjunction with the aperture(s). Essentially, the rotational movement of the forefoot portion 160 of an article of footwear 100 with respect to the rearfoot portion 140 can be controlled in a pre-selected manner by the shape and the selection of the material of the torsion system 50 in the intermediate portion 120. This embodiment may also include a cleat attachment system 180.

Figure 4:
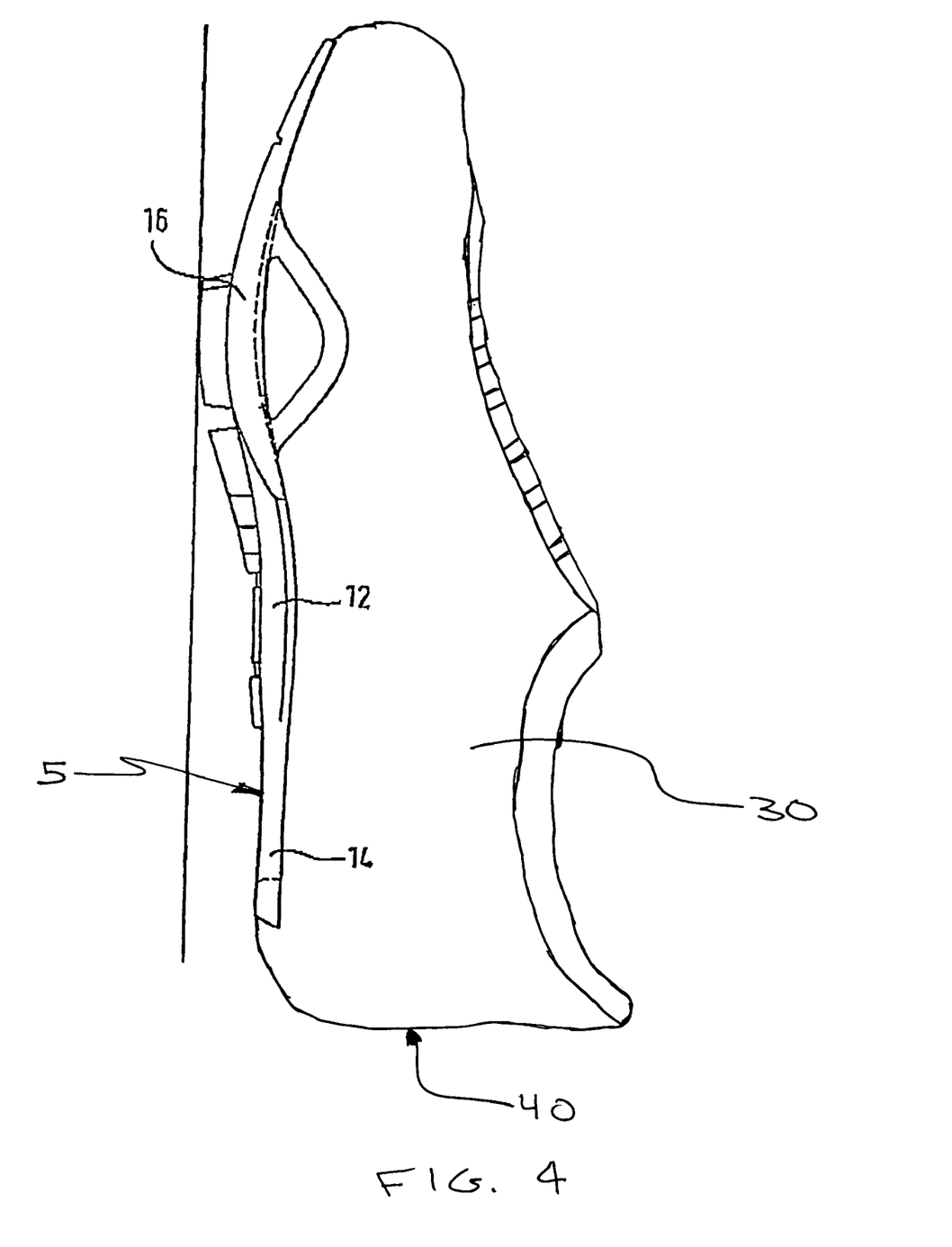
FIG. 4 is a schematic side view of the torsion system of FIG. 1 including a shoe upper.

FIG. 4 depicts the torsion system 5 of FIG. 1 including an upper 30 to form an article of footwear 40.

The torsion system may be constructed of a variety of materials; preferably nylon or a composite material is used for fatigue strength, durability, and low weight. Composite materials may include: graphite, fiberglass, carbon fibers embedded in a matrix of resin, or para-aramid fibers, such as the Kevlar® brand sold by DuPont. Suitable plastic materials include thermoplastic polyether block amides, such as the Pebax® brand sold by Elf Atochem, and thermoplastic polyester elastomers, such as the Hytrel® brand sold by DuPont.

Plastic materials have advantages with respect to production by injection molding; however, to obtain the desired rigidity and torsional strength, reinforcement may be required. Other suitable materials will be apparent to those of skill in the art.

Having described embodiments of the invention, it will be apparent to those of ordinary skill in the art that other embodiments incorporating the concepts disclosed herein may be used without departing from the spirit and the scope of the invention. The described embodiments are to be considered in all respects only as illustrative and not restrictive. Therefore, it is intended that the scope of the present invention be only limited by the following claims.

What is claimed is:

1. A torsion system for a cycling shoe including a sole with a forefoot area and a rearfoot area, the torsion system including a longitudinal axis and comprising:
    a forefoot portion of the torsion system spanning the forefoot area of the sole, the forefoot portion having a generally smooth concave contour along the longitudinal axis;
    a rearfoot portion of the torsion system spanning the rearfoot area of the sole; and
    an intermediate portion of the torsion system coupling the forefoot portion and the rearfoot portion, and constructed of a material and configured to allow, in a preselected manner, rotation of the forefoot portion relative to the rearfoot portion about the longitudinal axis, wherein the intermediate portion includes a rib that projects beyond an adjacent surface of the torsion system, wherein the rib tunes torsionability of the cycling shoe.

2. The torsion system of claim 1, wherein the forefoot portion and rearfoot portion rotate between about 5-25 degrees relative to each other about the longitudinal axis at 35 Newtons of torsional load.

3. The torsion system of claim 1, wherein the forefoot portion and rearfoot portion rotate between about 10-20 degrees relative to each other about the longitudinal axis at 35 Newtons of torsional load.

4. The torsion system of claim 1, wherein the forefoot portion and rearfoot portion rotate about 10 degrees relative to each other about the longitudinal axis at 35 Newtons of torsional load.

5. The torsion system of claim 1, wherein the intermediate portion defines at least one circumscribed aperture.

6. The torsion system of claim 1, wherein the rearfoot portion defines at least one aperture.

7. The torsion system of claim 1, wherein the forefoot portion, the rearfoot portion, and the intermediate portion form a single plate.

8. The torsion system of claim 1, further comprising an upper.

9. The torsion system of claim 1, further comprising an outsole.

10. The torsion system of claim 1, further comprising a cleat attachment system disposed on the forefoot portion.

11. The torsion system of claim 7, wherein the plate is substantially rigid in a horizontal plane.

12. The torsion system of claim 7, wherein the plate is between about 1-15 mm thick.

13. The torsion system of claim 7, wherein the plate is between about 3-10 mm thick.

14. The torsion system of claim 7, wherein the plate is between about 5-8 mm thick.

15. The torsion system of claim 7, wherein a thickness of the plate is less in the intermediate portion than in the forefoot and rearfoot portions.

16. The torsion system of claim 7, wherein a width of the intermediate portion of the plate is narrower than the forefoot and rearfoot portions.

17. The torsion system of claim 7, wherein the plate comprises nylon.

18. The torsion system of claim 7, wherein the plate comprises a composite material.

19. The torsion system of claim 7, wherein the forefoot portion and rearfoot portion comprise material properties different than the intermediate portion.

20. The torsion system of claim 18, wherein the composite material is graphite.

21. The torsion system of claim 18, wherein the composite material is fiberglass.

* * * * *